K. McDONALD.

WATER HEATER.

No. 10,187. Reissued Aug. 22, 1882.

WITNESSES

Fenton Myers

Jas. A. Baxter.

INVENTOR

Kenneth McDonald

By Myers & Co

ATTORNEYS.

N. PETERS, Photo-Lithographer, Washington, D. C.

UNITED STATES PATENT OFFICE.

KENNETH McDONALD, OF PORTLAND, MAINE.

WATER-HEATER.

SPECIFICATION forming part of Reissued Letters Patent No. 10,187, dated August 22, 1882.

Original No. 228,208, dated June 1, 1880. Application for reissue filed April 25, 1882.

*To all whom it may concern:*

Be it known that I, KENNETH McDONALD, a citizen of the United States, residing at Portland, in the county of Cumberland and State of Maine, have invented certain new and useful Improvements in Water-Heaters; and I do hereby declare that the following is a full, clear, and exact description of the invention, sufficient to enable others skilled in the art to which it appertains to make and use the same, reference being had to the accompanying drawings, and to the letters of reference marked thereon, and in which—

Figure 1:
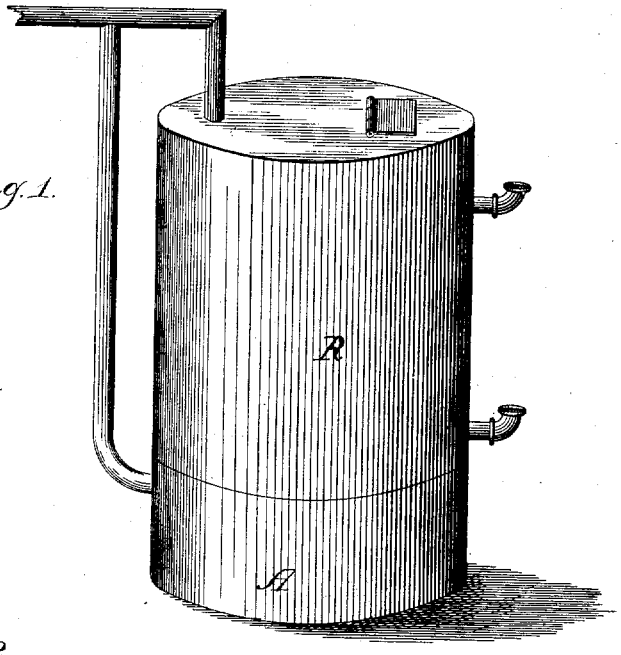
Figure 2:
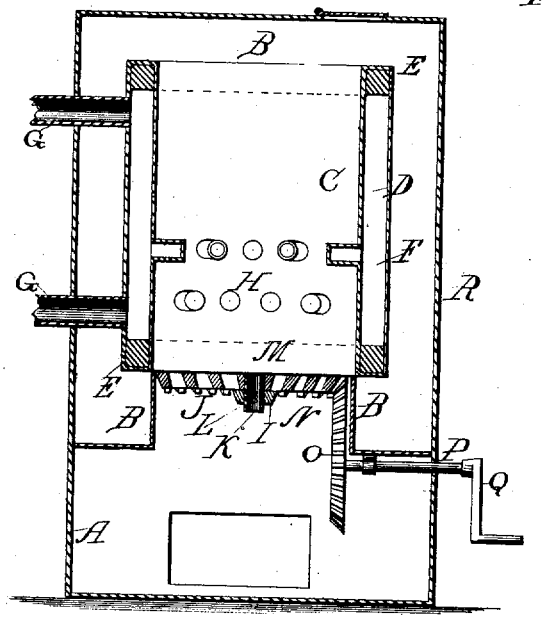
Figure 3:
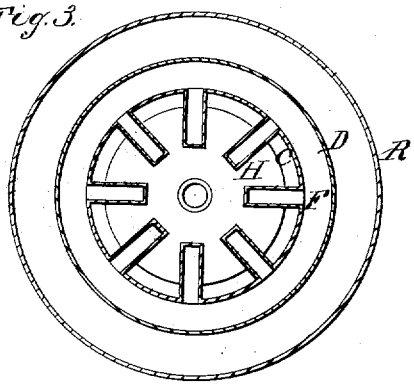
Figure 4:
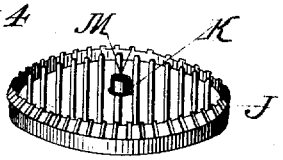

Figure 1 is a perspective view of my improved heater. Fig. 2 is a sectional elevation thereof, and Fig. 3 is a cross or horizontal section of the same. Fig. 4 is perspective view of the grate.

This invention has relation to improvements in heaters, having for its object mainly to promote the ready and thorough heating of the water; and it consists chiefly of annular chambers adapted to constitute the fire-pot and a receptacle for water, and in details of construction, substantially as hereinafter more fully set forth.

To carry out my invention, referring to the accompanying drawings, A indicates the cast-iron base which forms the ash-pit and supports the body B of the heater. The latter consists of two cylinders of boiler-iron, C D, so arranged as to provide an annular chamber, F, to hold water to be heated. The top and bottom of this chamber are made of wrought-iron rings E, of which material the cylinders of the said chamber are also made. Communicating with this annular hot-water chamber F are two pipes, G, passed through the outer or surrounding casing—one for the admission of cold water and the other for the exit of hot water. The inner cylinder, D, of this chamber, which constitutes the fire-pot, is provided some distance above the grate with rows of pipes H, projecting inwardly into the fire-pot and having their ends closed.

Supported upon the base below the fire-pot is a cross-bar, I, which supports the grate J. The latter is provided with a central, pivot, K, passed through an eye, L, in the cross-bar, and having a central vertical opening, M. Upon the under side of the grate-rim are formed cogs N, which engage a pinion, O, upon a shaft, P, mounted in the side of the base and capable of being turned by a wrench or handle, Q. The cross-bar I, upon which the grate is supported, may also be rocked by means of a suitable wrench, thus tilting and dumping the grate.

R is an inclosing or surrounding casing, which is supported upon the base A, provided with a door in its top for feeding fuel into the fire-pot and adapted to permit carrying off the products of combustion.

It will be observed that the provision of the inner annular chamber constitutes the fire-pot, brings the water to the closest possible point to the fire, and thus, taken in connection with the pipe-projections H, effects the quick and thorough heating of the water. The rotation of the grate causes the interiorly-projecting tubes to break up the fire in the fire-pot. The grate may also be shaken or dumped when necessary.

Owing the central opening in the pivot, there is a central draft, and ashes are prevented from accummulating at this point, where there is least motion when the grate is shaken or turned. The heater is also extremely simple, inexpensive, and durable.

Having thus fully described my invention, I claim and desire to secure by Letters Patent—

1. In combination, a cylinder with an inner and outer shell held in place at each end by metal rings secured thereto between said shells, forming a water-space between the same, and a fire-grate removably attached to the bottom of said cylinder, forming, with said cylinder, a fire-pot.

2. The pipes H H, cylinders C D, wrought-iron rings E E, and water-reservoir F, substantially as shown and for the purpose described.

3. The combination of the base A, rocking cross-bar I, having central eye, L, grate J, having vertically-perforated pivot K and cogs N, the pinion O, and the water-chamber F, constructed with the interiorly-projecting pipe H, substantially as and for the purpose set forth.

In testimony whereof I affix my signature in presence of two witnesses.

KENNETH McDONALD.

Witnesses:

JOSEPH A. LOCKE,

IRA S. LOCKE.